US006424832B1

United States Patent
Britt et al.

(10) Patent No.: US 6,424,832 B1
(45) Date of Patent: Jul. 23, 2002

(54) METHOD OF SUPPORTING FUNCTIONALITY FOR ROAMER PORT CALLS IN A RADIO TELECOMMINICATIONS NETWORK IN WHICH NUMBER PORTABILITY IS IMPLEMENTED

(75) Inventors: Margaret Britt, Pointe-Claire; Jacques Bugnon, Repentigny, both of (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/302,089

(22) Filed: Apr. 29, 1999

(51) Int. Cl.[7] .................................................. H04Q 7/20
(52) U.S. Cl. ....................... 455/432; 455/422; 455/433; 455/560; 455/445
(58) Field of Search ........................ 455/445, 432–434, 455/435, 422, 423, 456, 461, 436–439, 440, 466, 412, 560; 379/220, 207, 230, 219, 221, 229, 231, 201, 111, 112, 115

(56) References Cited

U.S. PATENT DOCUMENTS

| 5,717,749 A | * | 2/1998 | Sneed, Jr. et al. | 379/207 |
| 5,953,663 A | * | 9/1999 | Maupin et al. | 455/433 |
| 6,058,313 A | * | 5/2000 | Slutsman et al. | 455/445 |
| 6,161,017 A | * | 12/2000 | Britt et al. | 455/445 |
| 6,192,242 B1 | * | 2/2001 | Rollender | 455/433 |
| 6,226,517 B1 | * | 5/2001 | Britt et al. | 455/445 |
| 6,240,296 B1 | * | 5/2001 | Yu et al. | 455/466 |
| 6,253,081 B1 | * | 6/2001 | Koster | 455/433 |

FOREIGN PATENT DOCUMENTS

| WO | WO 97/36451 | 10/1997 |
| WO | WO 97/46043 | 12/1997 |
| WO | WO 97/47153 | 12/1997 |
| WO | WO 00/10360 | 2/2000 |

* cited by examiner

Primary Examiner—Daniel Hunter
Assistant Examiner—Pablo N Tran
(74) Attorney, Agent, or Firm—Smith, Danamraj & Youst, P.C.; Sandra Beauchesne (57) ABSTRACT

A method of supporting functionality for roamer port calls in a radio telecommunications network in which Number Portability (NP) is implemented, the network having a plurality of mobile switching centers (MSCs) and home location registers (HLRs). The network includes a roamer port MSC having a roamer port which is shared with at least one neighboring MSC. A number portability database (NPDB) associates a location routing number (LRN) with each distinct MSC/HLR pair in the network. When a roamer port call, which includes the mobile directory number (MDN) of the called mobile station, is received in the roamer port MSC, the roamer port MSC determines whether the MDN falls within a ported range. If so, a request is sent to the NPDB to retrieve a LRN for the called mobile station. From the LRN, a HLR associated with the mobile station is identified. The roamer port MSC then sends a location request to the identified HLR which returns a routing number for the called mobile station, or indicates that a call-diversion type service is active. If no call-diversion type service is active, the roamer port MSC determines whether the called mobile station is located in a neighboring MSC to which the roamer port MSC allows routing of calls. If so, the call is routed locally to the neighboring MSC.

12 Claims, 5 Drawing Sheets

METHOD OF SUPPORTING FUNCTIONALITY FOR ROAMER PORT CALLS IN A RADIO TELECOMMINICATIONS NETWORK IN WHICH NUMBER PORTABILITY IS IMPLEMENTED

BACKGROUND OF THE INVENTION

1. Technical Field of the Invention

This invention relates to telecommunication systems and, more particularly, to a method of supporting functionality for roamer port calls in a radio telecommunications network in which Number Portability (NP) is implemented.

2. Description of Related Art

The term Number Portability (NP) is utilized in connection with several types of subscriber service changes in which a subscriber may keep his original telephone number. For example, NP may refer to location portability which involves the capability to physically move (port) a subscriber's line connection from one switch to another while retaining the subscriber's original telephone number. NP may also refer to service provider portability which involves changing a subscriber's service from one service provider to another while retaining the subscriber's original telephone number. Or NP may refer to service type portability which involves changing the type of service (for example from POTS to ISDN) while retaining the subscriber's original telephone number. The present invention relates to service provider portability, but is applicable to location portability as well.

Figure 1:
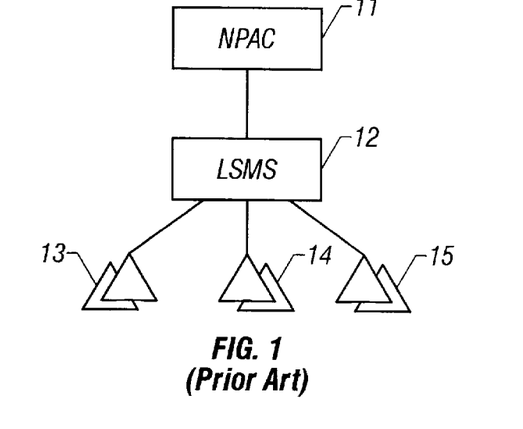
FIG. 1 (Prior Art) is a simplified block diagram of an existing NP network configuration.

FIG. 1 is a simplified block diagram of an existing NP network configuration. All information about ported numbers is loaded from a central database system consisting of several Number Portability Administration Centers (NPACs) 11 distributed throughout the country. In each area, the NP data is downloaded from the NPAC 11 to a Local Service Management System (LSMS) 12 in order to populate network elements 13–15 deployed in the NP network with the ported subscriber data. The network elements 13–15 may comprise service control points (SCPs) and/or service transfer points (STPs). Each service provider may implement its own LSMS, and each LSMS is notified by the NPAC which numbers are ported. In this way, callers in different networks continue to dial the subscriber's original number, and each network is aware of the fact that the dialed number has been ported, and routes the call accordingly.

Each portable number is identified by its Numbering Plan Area Office Code (NPA-NXX), where the NPA relates to the area code, and the NXX relates to the exchange code. For example, in the telephone number 214-997-1234, the NPA is 214 and the NXX is 997.

The ported subscriber data downloaded from the NPAC 11 and LSMS 12 for a single subscriber is grouped into a single record called an NP subscription. The information contained within the NP subscription is the routing data necessary to route a call to the subscriber's new location or new service provider's switch. The information is categorized as Location Routing Number (LRN) data and Global Title Translation (GTT) data. GTT data is necessary for the routing of services such as Line Information Database service (LIDB), Custom Local Area Signaling Services (CLASS), Caller ID With Name (CNAM), and Interswitch Voice Messaging (ISVM). Upon reception of this information from the NPAC 11, the LSMS 12 populates the LRN and GTT functions deployed in the network elements 13–15 with the relevant data elements.

Figure 2:
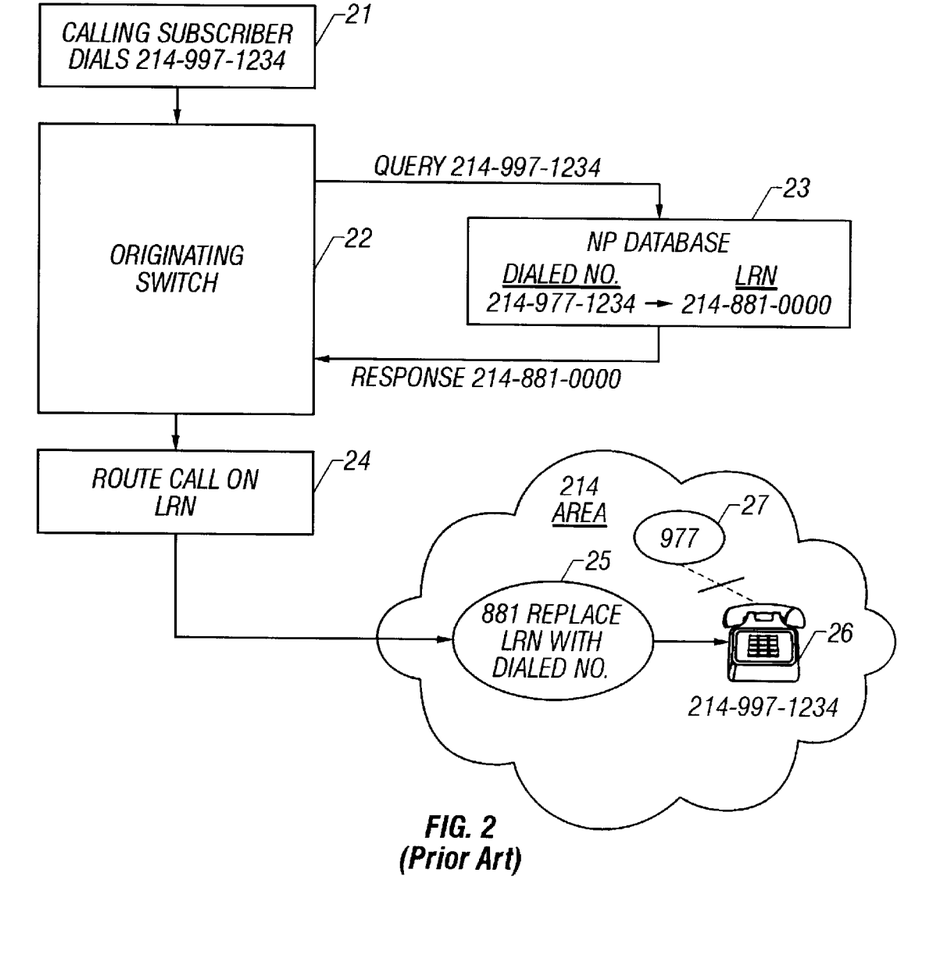
FIG. 2 (Prior Art) is an illustrative drawing illustrating the steps involved when retrieving a Location Routing Number (LRN) in an existing telecommunications network having NP service provisioning.

NP has been implemented in wireline telecommunications networks, and FIG. 2 is an illustrative drawing illustrating the steps involved when retrieving a Location Routing Number (LRN) in an existing wireline telecommunications network having NP service provisioning. At 21, a calling subscriber dials the telephone number of a called subscriber 26, for example 214-997-1234. The call is routed to an originating switch 22. There are mechanisms set up within the originating switch to recognize that the NPA-NXX (214-997) has been made open for portability. Therefore, a lookup is performed in the NP database 23 of a SCP associated with the originating switch to retrieve a LRN corresponding to the dialed telephone number. If the NP database indicates that the dialed number is not ported, then the dialed number (or an empty response) is returned to the originating switch. If the dialed number has been ported, the LRN of a recipient destination switch 25 is returned. The originating switch then routes the call on the LRN at 24 to the destination switch 25 which handles the NXX in the retrieved number (e.g., 881). The dialed telephone number is also carried in signaling, for example in the Generic Address Parameter (GAP) of ISUP common channel signaling. The destination switch replaces the LRN with the dialed telephone number since the called subscriber 26 is still using the dialed telephone number. The call completely bypasses the 997 NXX switch 27.

The Federal Communications Commission (FCC) has directed that NP be implemented in wireless radio telecommunications networks as well. Additional complexities are encountered in wireless networks due to the mobility of the subscribers. In wireless ANSI-41 networks today, a subscriber's Mobile Directory Number (MDN) and his mobile station's Mobile Identification Number (MIN) are generally identical. Several wireless features are built on the assumption of MIN-MDN equivalence. After the introduction of NP in wireless networks, a subscriber can keep his directory number as he changes from one service provider to another. However, when porting to an ANSI-41 network, the subscriber' mobile station is assigned a MIN that is generally different from his MDN. MINs are not portable in ANSI-41 networks, and each MIN series is tied to a particular home location register (HLR). Hence, features that assume MIN-MDN equivalence are impacted.

In particular, the implementation of NP impacts features such as functionality for roamer port calls delivered locally or after a location query to an HLR. Many operators support at least one roamer port in their networks. Roamer port numbers utilize two-stage dialing procedures to enable subscribers operating in the same local network to call each other without incurring long distance charges even though they are from different home networks. For example, if a subscriber from Montreal travels to Dallas and registers there, a calling party in Dallas can utilize the roamer port in Dallas to call the Montreal subscriber without incurring long distance charges. The calling party may be a mobile subscriber or someone calling from the PSTN. The roamer port belongs to the MSC of the Dallas service provider, with whom the Montreal subscriber's service provider has an agreement. The Dallas calling party dials the roamer port number for the roamer port mobile switching center (MSC) which is a local number. He then gets a second dial tone, and "over-dials" the Montreal subscriber's MDN. The roamer port number is defined in the Dallas MSC in which the Montreal subscriber is operating, and may serve the entire service area of the Dallas MSC or some sub-area thereof The roamer port number tells the Dallas MSC to page for the roaming mobile subscriber in the roamer port service area.

In this manner, the Dallas calling party is able to call the Montreal subscriber who is roaming in the Dallas network without using long distance trunks or incurring long distance charges.

Paging in wireless networks is performed utilizing the MIN of the mobile station rather than the subscriber's dialed MDN. Before the implementation of NP, the MDN and MIN were equivalent, so the MSC owning the roamer port could page the called mobile station using the dialed MDN. With NP, however, the MDN and MIN become distinct and separate numbers if a number is ported, and the MSC that has the roamer port must translate the over-dialed MDN to a MIN in order to page the subscriber and deliver the call.

Additional complexity is added by the fact that in metropolitan areas, a single roamer port can be shared by several MSCs. In this case, the current functionality is such that the MSC having the roamer port first checks in its own records to see if the MIN (equivalent to the dialed MDN) is being served. If so, the called mobile station is paged with the MIN, and the call is connected. If the MIN is not being served, the MSC sends a Location Request (LOCREQ) message to the called subscriber's HLR to find the subscriber's location. If the called subscriber is in one of the neighbor MSCs that is sharing the roamer port, a trunk is set up and the call is completed; if the called subscriber is not in the local area, the call is not completed.

To route the LOCREQ message to the proper HLR, the MSC consults its internal data structures to determine, based on the dialed MDN, which HLR to query. These internal data structures are manually-maintained lists of MDN-MIN or MDN-HLR associations. This method is feasible today because, in general, the MDN and MIN are identical. After the implementation of NP, however, maintaining these tables becomes unrealistic, since every MSC would have to update a MIN-MDN association for every subscriber every time a subscriber ports somewhere in the network.

There are no known prior art teachings of a solution to the aforementioned deficiency and shortcoming such as that disclosed herein. It would be advantageous to have a method of supporting functionality for roamer port calls in a radio telecommunications network in which Number Portability (NP) is implemented. The present invention provides such a method.

SUMMARY OF THE INVENTION

In one aspect, the present invention is a method of supporting functionality for roamer port calls delivered locally or after a location query to a Home Location Register (HLR) in a radio telecommunications network in which Number Portability (NP) is implemented. The network includes a plurality of mobile switching centers (MSCs). The method includes the steps of storing in each MSC, based on information received in the registration process, an association between a mobile identification number (MIN) and a mobile directory number (MDN) for each served mobile station (a MIN-MDN pair). When a roamer port call, which includes the MDN of the called mobile station, is received in a roamer port MSC, the roamer port MSC identifies the MIN of the called mobile station. Using the MIN, the roamer port MSC may page the mobile station in an attempt to deliver the call, or may instead utilize the MIN to identify the home location register (HLR) of the called mobile station. The method may then utilize the identified MIN to route a location request message to the identified HLR for call delivery or to invoke any active call-diversion type services.

In another aspect, the present invention is a method of supporting functionality for roamer port calls delivered locally or after a location query to a HLR in a radio telecommunications network in which Number Portability (NP) is implemented. The network includes a roamer port MSC having a roamer port which is shared with at least one neighboring MSC. Each MSC stores a MIN-MDN pair for each served mobile station. When a roamer port call, which includes the MDN of the called mobile station, is received in the roamer port MSC, the roamer port MSC determines whether it has stored a MIN-MDN pair for the called mobile station. If not, the roamer port MSC sends a message to the neighboring MSC inquiring whether the neighboring MSC has stored a MIN-MDN pair for the called mobile station. If so, the neighboring MSC may send the MIN, an indication of a trunk resource, or both to the roamer port MSC. If only a MIN is sent, the roamer port MSC then identifies the HLR of the called mobile station utilizing the identified MIN and issues a location query to the identified HLR to progress the call. If only an indication of a trunk resource is sent, the roamer port MSC may trunk the call to the neighboring MSC which then may either page the called mobile station directly or issue a location query to the HLR. If both a MIN and a trunk resource indication are sent, then internal procedures in the roamer port MSC determine which action to take.

In yet another aspect, the present invention is a method of supporting functionality for roamer port calls delivered locally or after a location query to a HLR in a radio telecommunications network in which NP is implemented. The network includes a roamer port MSC having a roamer port which is shared with at least one neighboring MSC. Within a number portability database (NPDB), a location routing number (LRN) is associated with each distinct MSC/HLR pair in the network. When a roamer port call, which includes the MDN of the called mobile station, is received in the roamer port MSC, the roamer port MSC determines whether the MDN for the called mobile station falls within a portable range. If so, a request is sent from the roamer port MSC to the NPDB to retrieve a LRN for the called mobile station, the request including the MDN for the called mobile station. From the LRN, a HLR associated with the mobile station is identified. The roamer port MSC then sends a location request to the identified HLR using the LRN as a global title address or using a LRN-HLR association table to route the location query. The HLR returns a routing number for the called mobile station. This is followed by determining whether the called mobile station is located in a location to which call delivery is allowed by the roamer port MSC.

In another aspect, the NPDB is modified to associate with the dialed MDN, a HLR pointer for the HLR where a subscriber record is maintained for the called mobile station. When a roamer port call is received in the roamer port MSC, and the MDN for the called mobile station falls within a portable range, the roamer port MSC retrieves the HLR pointer from the NPDB. This is followed by sending a location request from the roamer port MSC to the identified HLR, sending a routing number for the called mobile station from the HLR to the roamer port MSC, determining whether the called mobile station is located in a location to which call delivery is allowed by the roamer port MSC, and routing the call upon determining that the called mobile station is located in a location to which call delivery is allowed by the roamer port MSC. Alternatively, the NPDB may be modified to directly associate a MIN with the dialed MDN, and the MIN may be returned to the roamer port MSC from the NPDB so that the MSC can use the MIN to determine which HLR to query for location information.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is a method of supporting calls to mobile subscribers from roamer ports after the introduction of Number Portability (NP), when the mobile station's MIN and the subscriber's MDN are different, and in particular, when a roamer port is shared by several switches in a metropolitan area.

Figure 3:
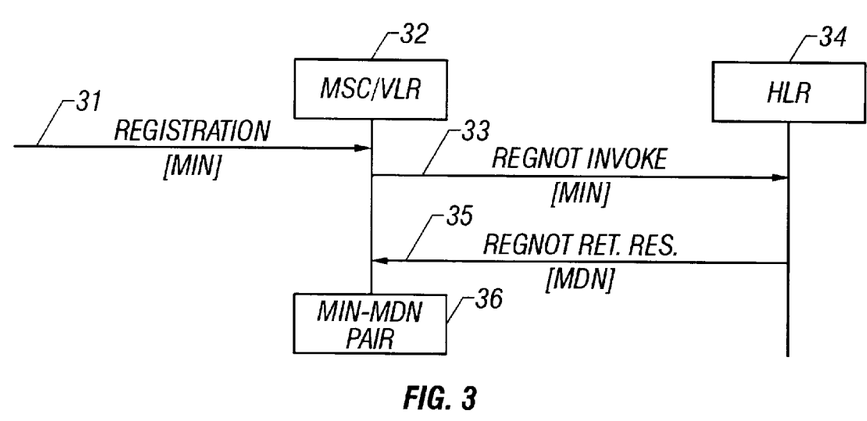
FIG. 3 is a message flow diagram illustrating the flow of messages when defining a MIN-MDN pair in a MSC following registration of a mobile station.

FIG. 3 is a message flow diagram illustrating the flow of messages when defining a MIN-MDN pair in a MSC following registration of a mobile station. When a mobile station registration 31 is received in a visited MSC/VLR 32, a Registration Notification (REGNOT) Invoke message 33 is sent to the HLR 34 with addressing based on the MIN received from the mobile station over the radio interface. The REGNOT Return Result message 35 returns the parameters that comprise the subscriber's profile including the MDN if the MDN is different from the MIN. At 36, the MSC/VLR then keeps a record of this MIN-MDN pair in its internal data structure.

Figure 4:
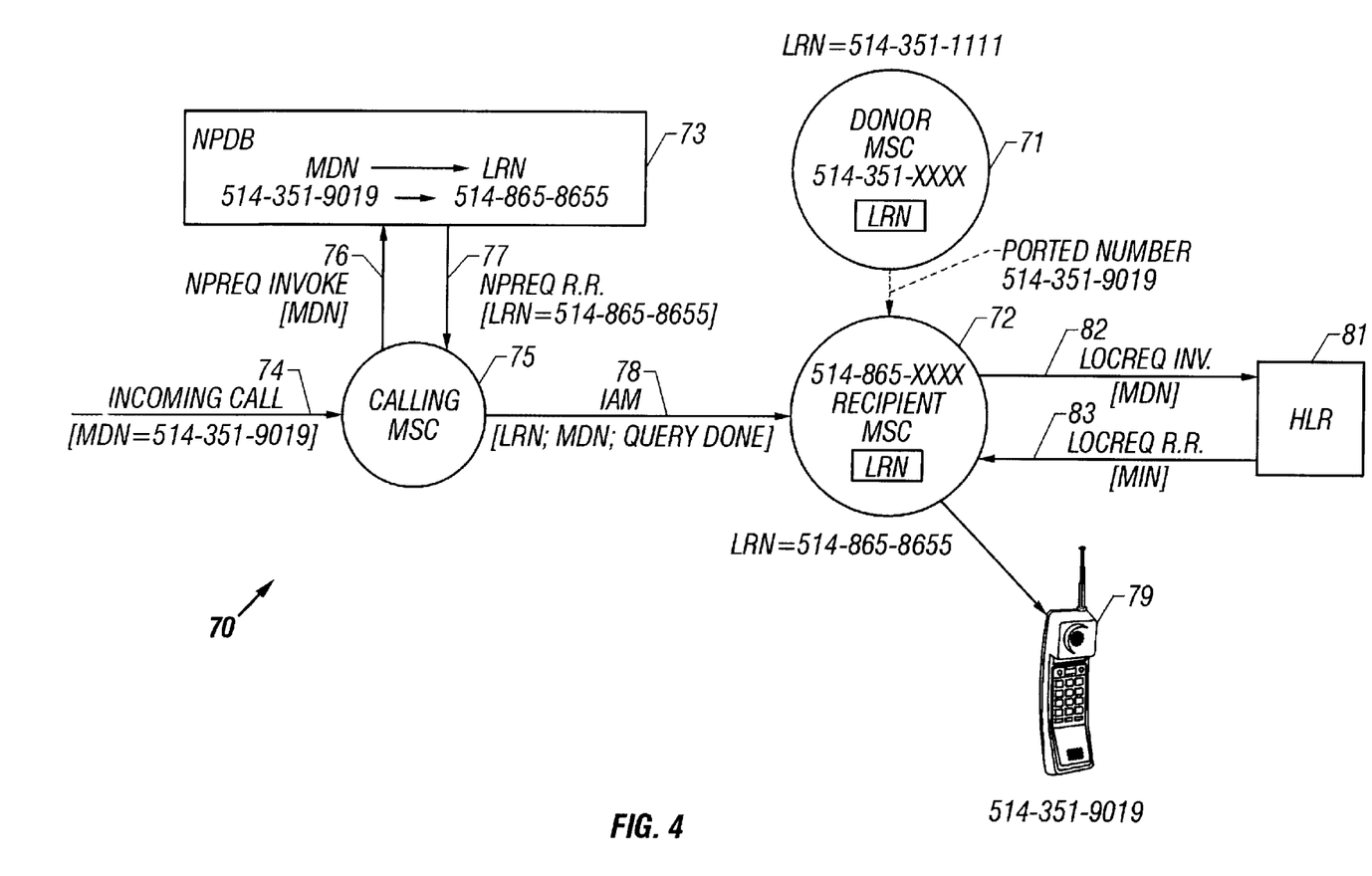
FIG. 4 is a simplified block diagram of a radio telecommunications network suitable for use with the present invention illustrating basic call delivery to a number that has been ported to a wireless service provider.

FIG. 4 is a simplified block diagram of a radio telecommunications network 70 suitable for use with the present invention illustrating basic call delivery to a number that has been ported to a wireless service provider. In this example, the called subscriber has severed the connection with a first service provider and a first MSC (the donor MSC) 71, and has moved to a second MSC (the recipient MSC) 72 with the same phone number (MDN). Each MSC is the home for a number series. The donor MSC 71 is the geographic home of the number series 514-351-XXXX, and the recipient MSC 72 is the home of the number series 514-865-XXXX.

The subscriber is moving to the recipient MSC with the phone number 514-351-9019. Each MSC in the network is paired with one or more HLRs. Within the number portability database (NPDB) 73, an LRN is then assigned to each MSC/HLR pair. Within each MSC, one number from the MSC's number series is reserved as the LRN. The LRN is a geographically significant number in that series which is used to point to the associated MSC and its paired HLR. For example, the donor MSC 71 (home of the 514-351-XXXX number series) may utilize 514-351-1111 as its LRN, and the recipient MSC 72 (home of the 514-865-XXXX number series) may utilize 514-865-8655 as its LRN. If the-recipient MSC was also associated with a second HLR, then another number from the 514-865 XXXX number series would be utilized as the LRN for that MSC/HLR pair.

When an incoming call 74 is received in the calling MSC 75, the call includes the called subscriber's MDN (514-351-9019). The calling MSC 75 is programmed to recognize that any dialed MDNs which fall in a defined portable range (e.g., 514-351-XXXX) require a query to the NPDB. Therefore, the calling MSC sends a Number Portability Request (NPREQ) Invoke message 76 to the NPDB 73 requesting a LRN. The NPDB associates the MDN of the called subscriber and the LRN of the MSC to which the called subscriber is ported. Thus, since the subscriber has ported to the recipient MSC 72, the LRN 514-865-8655 is returned in the NPREQ Return Result message 77. When the LRN is returned, the calling MSC 75 sends an Initial Address Message (IAM) 78 addressed to the LRN of the recipient MSC 72. The IAM includes the LRN, the called subscriber's MDN, and an indication that the query to the NPDB has been performed so that any intervening switches do not repeat the query. The recipient MSC analyzes the IAM and recognizes that the called number is its own LRN. This triggers the recipient MSC to search for another routing number in the LAM. It finds the MDN (514-351-9019), and routes the call to the called subscriber 79. Since the recipient switch is a MSC, and the called subscriber is a mobile station, the recipient MSC sends the MDN to the paired HLR 81 in a LOCREQ Invoke message 82 to retrieve a routing number for the mobile station. The routing number is then returned to the recipient MSC in a LOCREQ Return Result message 83. The recipient MSC then routes the call to the mobile station 79.

Figure 5:
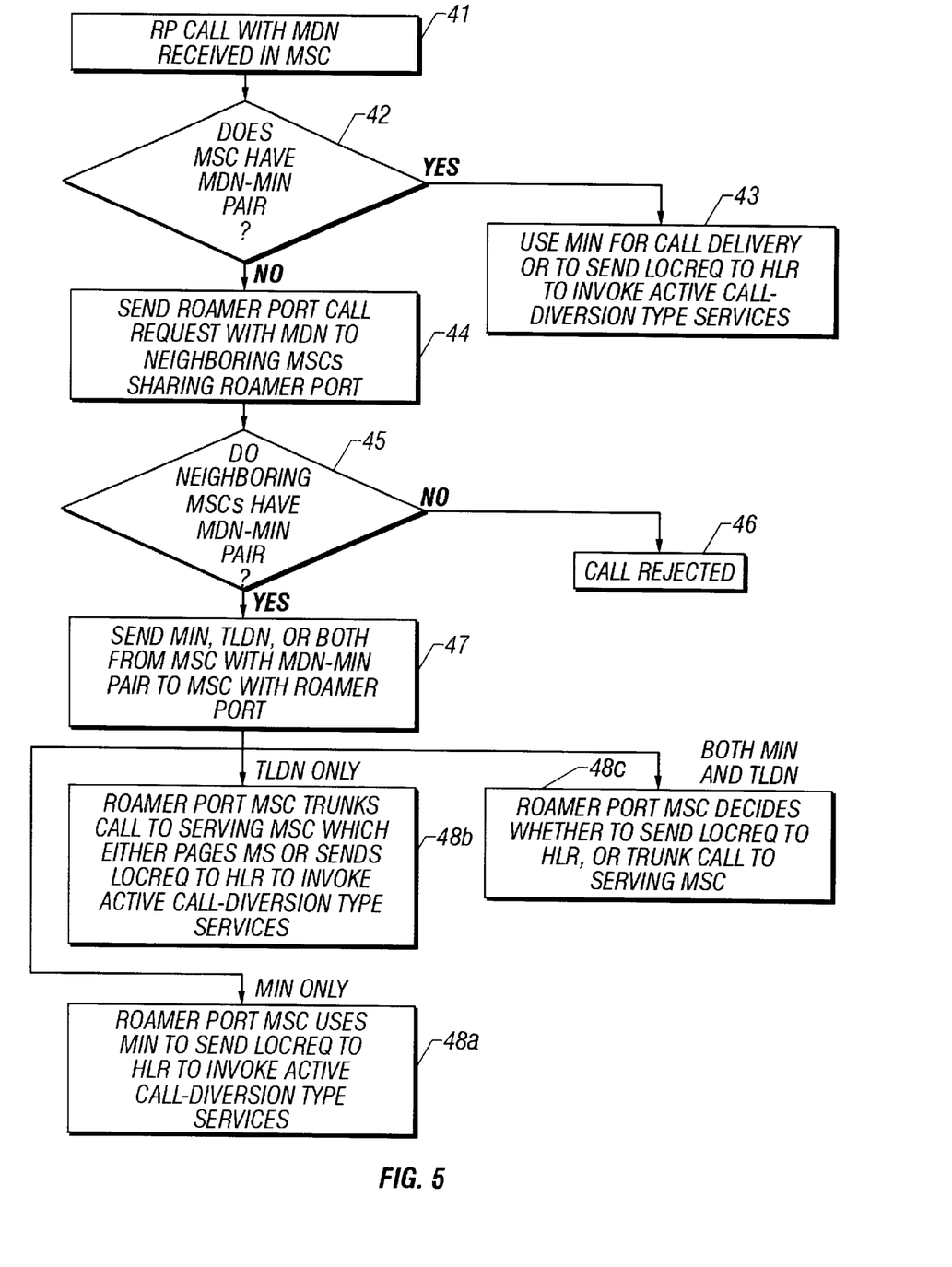
FIG. 5 is a flow chart illustrating a method of identifying a home location register (HLR) for a called mobile station when a roamer port call is received in a MSC, and NP has been implemented.

FIG. 5 is a flow chart illustrating a method of identifying a home location register (HLR) for a called mobile station when a roamer port call is received in a MSC/VLR (referred to as merely "MSC" hereinafter), and NP has been implemented. When NP is implemented, it is more difficult for a MSC to send a location request to the HLR following receipt of a roamer port call. If the dialed MDN ends in 0001, for example, it may be served by a first service provider in HLR-1, while a MDN ending in 0002 may be in a competitor's HLR. Thus, using the MDN to find the HLR presents problems. The network either has to use 10-digit GTT, which means that every MSC or STP must update a MDN-HLR or MDN-MIN association for every subscriber every time a subscriber ports somewhere in the network, or other methods must be utilized.

At step 41, a call which includes the MDN of the called subscriber is received at a roamer port. At 42, the MSC owning the roamer port checks its internal data structures to determine if it has a MDN-MIN association for this called subscriber. If it does, the MSC attempts to deliver the call at 43 using the MIN, or it can elect to send a LOCREQ message to the HLR in order to invoke any call-diversion type services that may be active in the HLR. The MSC uses the MIN to route the location request to the proper HLR.

If it is determined at 42 that the MSC owning the roamer port does not have a MDN-MIN association for the called subscriber, it cannot translate the dialed MDN to a MIN for paging purposes. In this case, the method moves to step 44 where the MSC sends a Roamer Port Call Request (RPCR) message to the neighboring MSCs that share the roamer port. The parameters of this message include the over-dialed MDN. The RPCR message is received by the other MSCs which in turn check their internal data structures at 45 to determine whether they have a MDN-MIN association available. If not, the call is rejected at step 46. However, if one of the MSCs has a MDN-MIN association available, the method moves to step 47 where the MSC with the MDN-MIN pair responds to the roamer port MSC with a response indicating a MIN, a trunk resource to be seized (such as a TLDN), or both. If only a MIN is sent, the method moves to step 48a where the roamer port MSC uses the MIN to send a location query such as a LOCREQ to the HLR for call delivery or to invoke any active call-diversion type services. If only a TLDN is sent, the method moves to step 48b where the roamer port MSC trunks the call to the MSC having a record for this subscriber (the serving MSC). The serving MSC may either page the mobile station in an attempt to deliver the call, or if desired, the serving MSC may use the looked-up MIN to route a location request to the HLR for call delivery or to invoke call-diversion type services, if appropriate. If both a MIN and a TLDN are sent, the method moves to step 48c where the roamer port MSC uses internal procedures to determine whether to send a LOCREQ to the HLR, or to trunk the call to the serving MSC.

Alternatively, instead of routing the call to the serving MSC, the roamer port MSC may query the neighboring MSCs merely to obtain the MIN from them. Once the MIN is received, the location request can be sent directly from the roamer port MSC to the HLR, and call delivery can continue normally. This avoids inefficient inter-switch routing when the location request reveals, for example, that a call-diversion service is active.

If call-diversion type services are active, they take precedence over delivering the call from the roamer port. For example, if the called subscriber forwarded his calls to voice mail, querying the HLR with a location request would ensure that all calls, including those from a roamer port, are sent to voice mail provided the roamer port MSC allows the call to be routed to the voice mail destination.

Instead of merely requesting routing information, the RPCR message from the MSC owning the roamer port may also request the neighboring MSCs to page the called mobile station. Alternatively, the ANSI-41 Intersystem Page message may be utilized for this purpose. This increases the likelihood of successful call delivery if the subscriber has moved to another MSC since his last registration.

In the preferred embodiment, each MSC in the network is paired with one or more HLRs. If one MSC communicates with multiple HLRs, a distinct LRN is defined for each MSC/HLR pair. Table 1 below provides an illustrative example of a database table that associates each distinct MSC/HLR pair with a unique LRN. Thus, each distinct MSC/HLR pair is associated with a specific and distinct LRN, even if a single MSC accesses more than one HLR, or a single HLR serves more than one MSC.

TABLE 1

| MSC | Associated HLR | Assigned LRN |
|-----|----------------|--------------|
| MSC-1 | HLR-1 | LRN-1 |
| MSC-2 | HLR-2 | LRN-2 |

TABLE 1-continued

| MSC | Associated HLR | Assigned LRN |
|-----|----------------|--------------|
| MSC-2 | HLR-3 | LRN-3 |
| MSC-3 | HLR-1 | LRN-4 |
| MSC-3 | HLR-3 | LRN-5 |
| MSC-3 | HLR-4 | LRN-6 |

Figure 6:
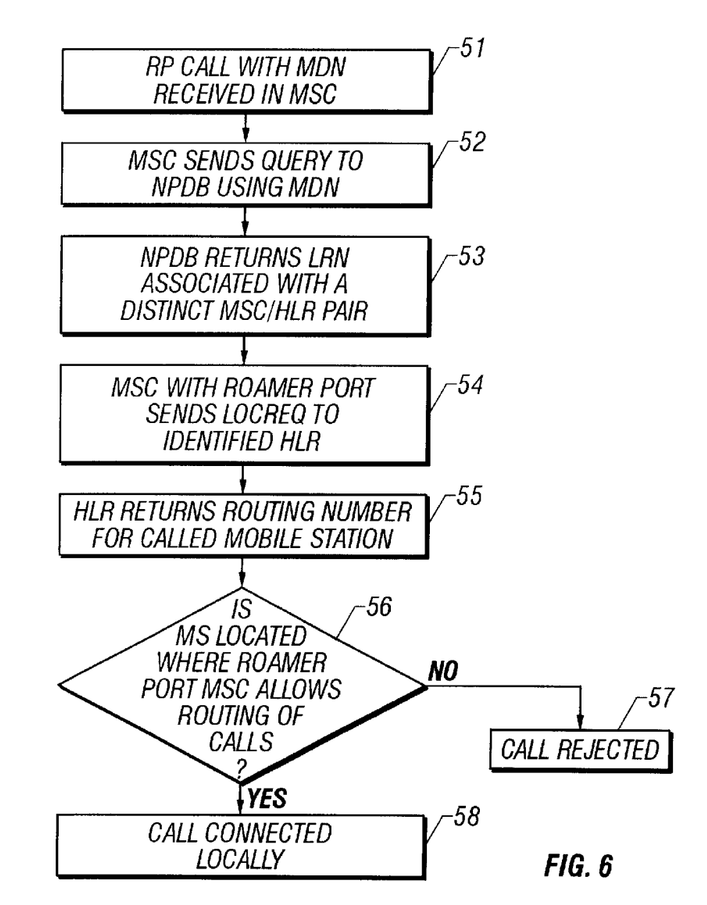
FIG. 6 is a flow chart illustrating a method of identifying a HLR for a called mobile station when a roamer port call is received in a MSC, NP has been implemented, and the MDN for the called mobile station has been ported.

FIG. 6 is a flow chart illustrating a method of identifying a HLR for a called mobile station when a roamer port call is received in a MSC, NP has been implemented, and the MDN for the called mobile station has been ported. When a call comes into the roamer port at 51, it includes the MDN of the called subscriber. The MSC owning the roamer port performs a query to the number portability database with the MDN at 52. The number portability database returns a location routing number (LRN) at 53. LRNs are assigned to switches that handle trunks (for example, MSCs), therefore HLRs do not have LRNs assigned. However, in the present invention, the LRN which is retrieved from the number portability database points to a distinct MSC/HLR pair. The MSC in the pair is the MSC to which the called MDN has been ported, and the HLR in the pair is the HLR containing the mobile station MIN and subscriber information for the called mobile station. Thus, even though the LRN belongs to the MSC from a routing perspective, the LRN can be analyzed to determine the correct HLR.

At step 54, the MSC owning the roamer port sends a LOCREQ message to the HLR requesting the location of the called mobile station. At 55, the HLR returns a routing number for the called mobile station. At 56, it is determined whether the called mobile station is located in a neighboring MSC to which the roamer port MSC allows routing of calls. If the mobile station is not in an allowed location, the call is rejected at 57. If the called mobile station is in a location allowed by the roamer port MSC, the call is connected locally at 58.

Figure 7:
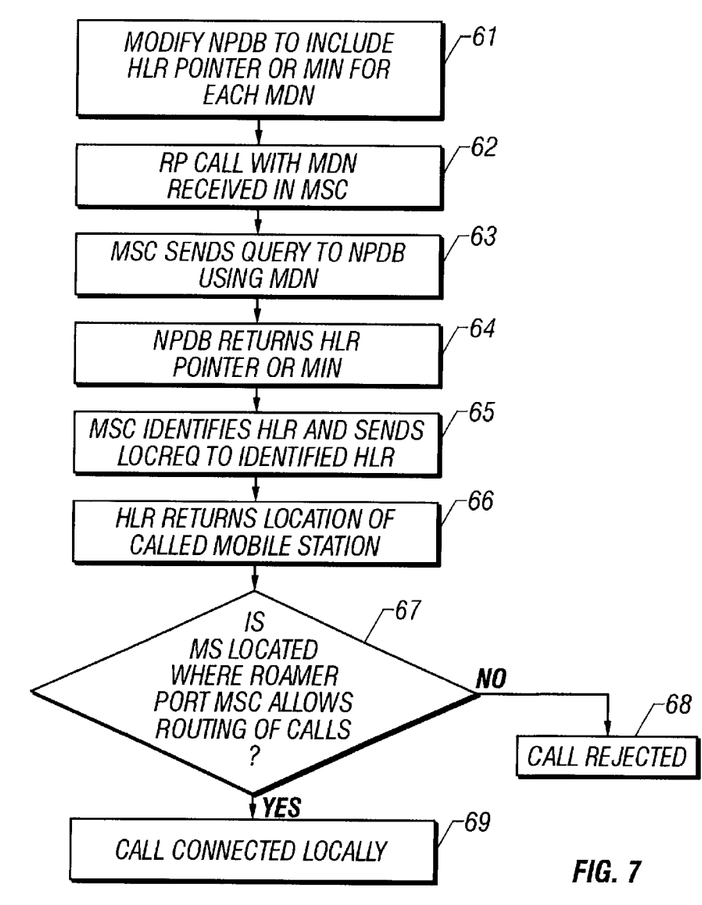
FIG. 7 is a flow chart illustrating an alternative method of identifying a HLR for a called mobile station when a roamer port call is received in a MSC, NP has been implemented, and the MDN for the called mobile station has been ported.

This approach is preferred due to the fact that current NP standards may not allow additional data fields in the number portability database. An alternative method is shown in FIG. 7. In this method, the number portability database is modified at step 61 to include either a HLR pointer or the MIN associated with each MDN. In this way, when a call comes into the roamer port at 62, the MSC uses the MDN to perform a query at 63 to the number portability database. The number portability database returns either a HLR pointer or the MIN associated with the MDN. With the MIN, the HLR can be identified since a MIN series still points to a particular HLR, although a MDN series does not. Thus, the MSC identifies the HLR and sends a LOCREQ message to the identified HLR at 65. At 66, the HLR returns the location of the called mobile station. At 67, it is determined whether the called mobile station is located in a neighboring MSC to which the roamer port MSC allows routing of calls. If the mobile station is not in an allowed location, the call is rejected at 68. If the called mobile station is in a location allowed by the roamer port MSC, the call is connected locally at 69.

It is thus believed that the operation and construction of the present invention will be apparent from the foregoing description. While the method shown and described has been characterized as being preferred, it will be readily apparent that various changes and modifications could be made therein without departing from the scope of the invention as defined in the following claims.

What is claimed is:

1. A method of supporting functionality for roamer port calls delivered locally or after a location query to a Home Location Register (HLR) in a radio telecommunications network in which Number Portability (NP) is implemented, said network having a plurality of mobile switching centers (MSCs), said method comprising the steps of:

storing in each MSC, a MIN-MDN pair, said MIN-MDN pair being an association between a mobile identification number (MIN) and a mobile directory number (MDN) obtained from registration information for each served mobile station;

receiving a roamer port call in a roamer port MSC for a mobile station, wherein the roamer port MSC includes a roamer port which is shared with at least one neighboring MSC which neighbors the roamer port MSC, said roamer port call including the MDN of the called mobile station;

identifying in the roamer port MSC, the MIN of the called mobile station utilizing the stored MIN-MDN pair, and the step of identifying the MIN of the called mobile station including:

determining in the roamer port MSC whether a MIN-MDN pair for the called mobile station is stored in the roamer port MSC;

upon determining that a MIN-MDN pair for the called mobile station is not stored in the roamer port MSC, sending a message from the roamer port MSC to the neighboring MSC, said message inquiring whether the neighboring MSC has stored a MIN-MDN pair for the called mobile station; and upon determining that the neighboring MSC has stored a MIN-MDN pair for the called mobile station, sending the MIN from the neighboring MSC to the roamer port MSC;

determining whether the called mobile station is operating in the roamer port MSC utilizing its identified MIN; and delivering by the roamer port MSC, the roamer port call to the called mobile station upon determining that the called mobile station is operating in the roamer port MSC.

2. The method of supporting functionality for roamer port calls of claim 1 further comprising utilizing the identified MIN to route a location request message from the roamer port MSC to the identified HLR for call delivery or to invoke any active call-diversion type services, as determined by the HLR.

3. The method of supporting functionality for roamer port calls of claim 1 further comprising the steps of:

sending an indication of a trunk resource from the neighboring MSC to the roamer port MSC; and routing the call to the neighboring MSC.

4. The method of supporting functionality for roamer port calls of claim 3 further comprising utilizing the identified MIN to route a location request message from the neighboring MSC to the identified HLR for call delivery or to invoke any active call-diversion type services, as determined by the HLR.

5. The method of supporting functionality for roamer port calls of claim 1 wherein the step of sending a message from the roamer port MSC to the neighboring MSC inquiring whether the neighboring MSC has stored a MIN-MDN pair for the called mobile station also includes sending a message which requests the neighboring MSC to page the called mobile station.

6. The method of supporting functionality for roamer port calls of claim 5 wherein the step of sending a message which requests the neighboring MSC to page the called mobile station includes sending an ANSI-41 Intersystem Page message.

7. A method of supporting functionality for roamer port calls in a radio telecommunications network in which Number Portability (NP) is implemented, said network having a plurality of mobile switching centers (MSCs), said method comprising the steps of:

storing in each MSC, a MIN-MDN pair, said MIN-MDN pair being an association between a mobile identification number (MIN) and a mobile directory number (MDN) for each served mobile station;

receiving a roamer port call in a roamer port MSC for a mobile station, the roamer port MSC including a roamer port which is shared with at least one neighboring MSC which neighbors the roamer port MSC, and said roamer port call including the MDN of the called mobile station;

determining in the roamer port MSC whether a MIN-MDN pair for the called mobile station is stored in the roamer port MSC;

upon determining that a MIN-MDN pair for the called mobile station is not stored in the roamer port MSC, sending a message from the roamer port MSC to the neighboring MSC, said message -inquiring whether the neighboring MSC has stored a MIN-MDN pair for the called mobile station;

upon determining that the neighboring MSC has stored a MIN-MDN pair for the called mobile station, sending the MIN and an indication of a trunk resource from the neighboring MSC to the roamer port MSC;

identifying the home location register (HLR) of the called mobile station utilizing the identified MIN;

utilizing the identified MIN to route a location request message to the identified HLR to determine whether any call-diversion type services are active;

invoking call-diversion type services that are active; and routing the call to the neighboring MSC upon determining that no call-diversion type services are active.

8. The method of supporting functionality for roamer port calls of claim 7 wherein the step of sending a message from the roamer port MSC to the neighboring MSC inquiring whether the neighboring MSC has stored a MIN-MDN pair for the called mobile station also includes sending a message which requests the neighboring MSC to page the called mobile station.

9. The method of supporting functionality for roamer port calls of claim 8 wherein the step of sending a message which requests the neighboring MSC to page the called mobile station includes sending an ANSI-41 Intersystem Page message.

10. A method of supporting a roamer port call to a called mobile station in a radio telecommunications network in which Number Portability (NP) is implemented, said network having a plurality of mobile switching centers (MSCs) and home location registers (HLRs), said method comprising the steps of:

modifying a number portability database (NPDB) to associate with a dialed mobile directory number (MDN), an indication of an HLR where a subscriber record is maintained for the called mobile station;

receiving a roamer port call in a roamer port MSC for a mobile station, the roamer port MSC including a roamer port which is shared with at least one neighboring MSC which neighbors the roamer port MSC, and said roamer port call including the MDN for the called mobile station;

determining in the roamer port MSC that the MDN for the called mobile station falls within a portable range;

sending a request from the roamer port MSC to the NPDB for the indication of the called mobile station's HLR, said request including the MDN for the called mobile station;

sending the indication of the called mobile station's HLR from the NPDB to the roamer port MSC;

sending a location request from the roamer port MSC to the identified HLR;

sending a routing number for the called mobile station from the HLR to the roamer port MSC;

determining whether the called mobile station is located in a neighboring MSC to which the roamer port MSC allows routing of calls; and routing the call locally to the neighboring MSC upon determining that the called mobile station is located in a neighboring MSC to which the roamer port MSC allows routing of calls.

11. The method of supporting a roamer port call to a called mobile station of claim 10 wherein the step of modifying the NPDB to associate a dialed MDN with an indication of an HLR includes associating the MDN with a HLR pointer.

12. The method of supporting a roamer port call to a called mobile station of claim 10 wherein the step of modifying the NPDB to associate a dialed MDN with an indication of an HLR includes associating the MDN with the MIN for the called mobile station.

* * * * *